(12) United States Patent
Rácz et al.

(10) Patent No.: US 10,693,937 B2
(45) Date of Patent: Jun. 23, 2020

(54) METHOD FOR VOLTE VOICE QUALITY FAULT LOCALIZATION (71) Applicant: Telefonaktiebolaget LM Ericsson (publ), Stockholm (SE)

(72) Inventors: András Rácz, Budapest (HU); Norbert Reider, Tényö (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 84 days.

(21) Appl. No.: 16/304,801

(22) PCT Filed: Jun. 12, 2017

(86) PCT No.: PCT/EP2017/064266
§ 371 (c)(1),
(2) Date: Nov. 27, 2018

(87) PCT Pub. No.: WO2017/216097
PCT Pub. Date: Dec. 21, 2017

(65) Prior Publication Data
US 2019/0312923 A1 Oct. 10, 2019

Related U.S. Application Data (60) Provisional application No. 62/350,789, filed on Jun. 16, 2016.

(51) Int. Cl.
*H04L 29/06* (2006.01)
*H04L 12/24* (2006.01)
(Continued)

(52) U.S. Cl.
CPC .......... *H04L 65/80* (2013.01); *H04L 41/0677* (2013.01); *H04W 24/02* (2013.01); *H04W 24/08* (2013.01)

(58) Field of Classification Search
CPC ....... H04L 41/0677; H04L 65/80; H04L 1/00; H04L 43/00; H04L 43/50; H04W 24/02; H04W 24/08; H04B 17/00
(Continued)

(56) References Cited

U.S. PATENT DOCUMENTS 10,531,309 B1 * 1/2020 Li .............................. H04B 7/02
2009/0075648 A1 * 3/2009 Reed ................... H04L 41/0823
455/424
(Continued)

OTHER PUBLICATIONS

Telecom Austria AG, "Core Network Interoperability Testing (INT); VoLTE and ViLTE interconnect and roaming test specification with QoS/QoE", Technical Specification, ETSI TS 103 397 V 0.0.21, Nov. 28, 2016, pp. 1-110, ETSI.
(Continued)

*Primary Examiner* — Robert J Lopata
(74) *Attorney, Agent, or Firm* — Coats & Bennett, PLLC (57) ABSTRACT

Methods and apparatus for identifying a source of quality degradation for a media call flowing in a first direction and a second direction between a mobile-originating user equipment (UE) and a mobile-terminating (MT) UE are presented. In an example method, a network node obtains a set of multiple rules specified respectively for multiple candidate sources of quality degradation for the media call in the first direction. These rules indicate whether a particular candidate source is an actual source of quality degradation based on values of certain key performance indicators (KPIs). The network node identifies, from among the multiple candidate sources of quality degradation, one or more sources of quality degradation by evaluating one or more rules from the set of multiple rules.

21 Claims, 5 Drawing Sheets

(51) Int. Cl.
*H04W 24/08* (2009.01)
*H04W 24/02* (2009.01)

(58) Field of Classification Search
USPC .......................................................... 370/242
See application file for complete search history.

(56) References Cited

U.S. PATENT DOCUMENTS

| | | | | |
|---|---|---|---|---|
| 2009/0075655 | A1* | 3/2009 | Dobson | H04L 41/5009 455/436 |
| 2010/0203881 | A1* | 8/2010 | del Rio Romero | H04W 24/02 455/423 |
| 2011/0047418 | A1* | 2/2011 | Drees | G05B 23/00 714/57 |
| 2012/0188879 | A1* | 7/2012 | Huang | H04L 41/5067 370/242 |
| 2013/0227103 | A1* | 8/2013 | Garimella | H04L 41/5054 709/223 |
| 2013/0250786 | A1 | 9/2013 | Balasaygun et al. | |
| 2014/0068348 | A1 | 3/2014 | Mondal et al. | |
| 2014/0220998 | A1* | 8/2014 | Kovacs | H04W 28/08 455/453 |
| 2014/0336984 | A1* | 11/2014 | Starr | G05B 23/0235 702/183 |
| 2015/0087325 | A1* | 3/2015 | Nuss | H04W 24/02 455/453 |
| 2015/0138989 | A1 | 5/2015 | Polehn et al. | |
| 2015/0326447 | A1 | 11/2015 | Yoon et al. | |
| 2016/0014617 | A1* | 1/2016 | Sofuoglu | H04W 24/02 370/252 |
| 2016/0142931 | A1 | 5/2016 | Modal et al. | |
| 2017/0063621 | A1* | 3/2017 | Sanneck | H04L 41/0813 |
| 2017/0126476 | A1* | 5/2017 | Curtin | H04L 41/5009 |
| 2017/0200088 | A1* | 7/2017 | Yang | H04W 24/04 |
| 2017/0262781 | A1* | 9/2017 | Yang | G06Q 10/06395 |
| 2017/0310562 | A1* | 10/2017 | Jin | H04L 67/1097 |
| 2017/0373950 | A1* | 12/2017 | Szilagyi | H04L 43/00 |
| 2018/0131559 | A1* | 5/2018 | Tapia | H04L 41/5009 |

OTHER PUBLICATIONS

Rouault, Y., "QoE test solutions for VoLTE networks; Troubleshooting—Simulation—Service Assurance", ETSI draft, Sep. 3, 2014, pp. 1-37, EXFO.

International Telecommunication Union, "End-to-end quality of service for voice over 4G mobile networks", Series G: Transmission Systems and Media, Digital Systems and Networks; Multimedia Quality of Service and performance—Generic and user-related aspects, G.1028, Apr. 1, 2016, pp. 1-42, ITU-T.

3rd Generation Partnership Project, "3rd Generation Partnership Project; Technical Specification Group Services and System Aspects; Media and Quality Aspects of SRVCC Enhancements; (Release 13)", Technical Report, 3GPP TR 26.916 V0.1.3, Oct. 1, 2015, pp. 1-40, S4-151563, 3GPP.

European Telecommunications Standards Institute, "Vol TE QoS Assessment, Technology Evaluation Plugtests"; ETSI CTI Plugtests Report 0.0.4, Sophia Antipolis, France; Nov. 18, 2013, pp. 1-44, ETSI.

Wakiel, M. et al., "Design of Quality of Service Parameters for Voice over Long Term Evolution "LTE" Network", International Journal of Sciences: Basic and Applied Research (IJSBAR), vol. 28, No. 2, pp. 107-125.

* cited by examiner

METHOD FOR VOLTE VOICE QUALITY FAULT LOCALIZATION

TECHNICAL FIELD

The application relates to methods and apparatus for identifying a source of quality degradation during a media call between user equipment (UE).

BACKGROUND

Existing wireless systems that utilize Long-Term Evolution (LTE) wireless communication standards (developed by the 3rd Generation Partnership Project (3GPP)) can be configured to deliver voice traffic between UEs (or other terminal-side devices) using Voice-over LTE (VoLTE). In systems using VoLTE, control plane signalling and media plane voice data is communicated between UEs over the Internet Protocol Multimedia Subsystem (IMS) using LTE data bearer, meaning that the voice call is conducted exclusively within the packet-switched domain.

To maintain high quality voice calls using VoLTE, operators often monitor the performance of voice calls over their networks using one or more KPIs. The KPIs for a particular voice call are often computed based on characteristics of voice call packets sampled by network- and UE-side data collection modules, or "probes," which are situated along the voice call path. In addition, these probes can compute the KPI values from the observed characteristics and may analyze call data to determine overall call performance (i.e., end-of-call analysis at a whole-call level of granularity). Although insight into overall call performance can be helpful for determining whether a quality problem exists along the voice call path, existing systems have not used KPI data to provide insight into the sources of any quality degradation, nor have they utilized techniques for performing such analysis at higher levels of temporal granularity.

SUMMARY

One or more embodiments herein compute values of location-specific KPIs using voice call data observed at defined interfaces along the voice call path. By analyzing these KPI values during and after the call, example embodiments can not only identify likely sources of quality degradation in a voice call, but can do so with greater temporal granularity than is provided by existing call monitoring techniques.

Some embodiments, for example, include a method implemented at a network node for identifying a source of quality degradation for a media call flowing in a first direction from a first call leg to a second call leg via a gateway (GW) domain and in a second direction from the second call leg to the first call leg via the GW domain. In some examples, the first call leg extends from a first UE to a first interface of the GW domain via a first radio access network and the second call leg extends from a second interface of the GW domain to a second UE via a second radio access network. According to example embodiments, an example method may include obtaining a set of multiple rules specified respectively for multiple candidate sources of quality degradation for the media call in the first direction. The set of multiple rules may include two or more rules, and may be selected from the following example rules. An example rule holds that the first UE is a source of quality degradation if a first KPI indicating performance of the media call at the first UE in the first direction does not satisfy a first performance criterion defined for the first KPI. Another rule holds that the first leg in the first direction is a source of quality degradation if a second KPI indicating performance of the media call at the first interface of the GW domain does not satisfy a second performance criterion defined for the second KPI. A further rule holds that the GW domain is a source of quality degradation if a third KPI indicating performance of the media call at the second interface of the GW domain does not satisfy a third performance criterion defined for the third KPI, but the second KPI does satisfy the second performance criterion. Another rule holds that the GW domain is a source of quality degradation if the second KPI is worse than the third KPI. Another rule holds that the second leg in the first direction is a source of quality degradation if a fourth KPI indicating performance of the media call at the second radio access network does not satisfy a fourth performance criterion defined for the fourth KPI, but the third KPI does satisfy the third performance criterion. An additional example rule holds that the second UE is a source of quality degradation if the second KPI satisfies the second performance criterion and the fourth KPI satisfies the fourth performance criterion, but a fifth KPI indicating performance of the media call at the second UE in the first direction does not satisfy a fifth performance criterion defined for the fifth KPI.

The example method may also include identifying, from among the multiple candidate sources of quality degradation, one or more sources of quality degradation by evaluating one or more rules from the set of multiple rules. Further embodiments include corresponding apparatus, computer programs, and computer program products.

DETAILED DESCRIPTION

Figure 1:
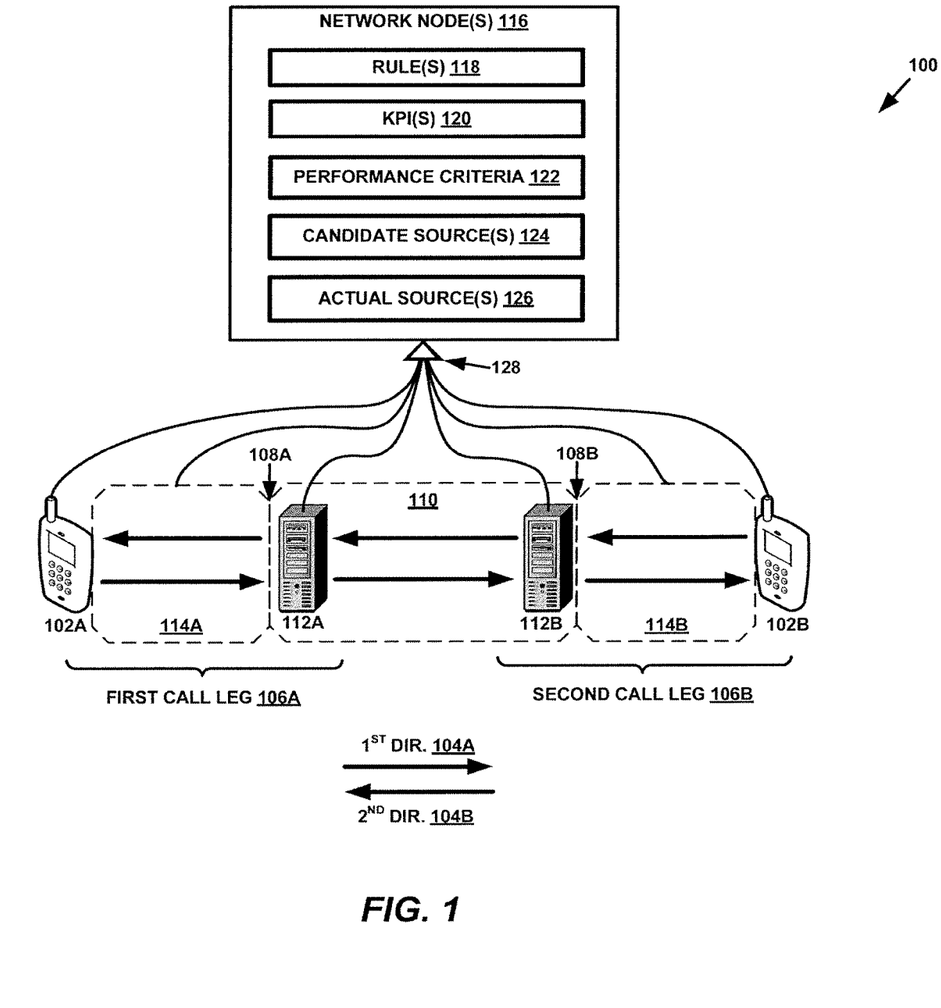
FIG. 1 illustrates a communication network corresponding to example embodiments of the present invention.

FIG. 1 illustrates a communication network 100 that is configured to facilitate a media call (e.g., a voice and/or video call) between a first UE 102A and a second UE 102B. The network 100 is configured to deliver the media call traffic between the UEs 102A and 102B in a first direction 104A (from a first call leg 106A to a second call leg 106B) and a second direction 104B (from the second call leg 106B to the first call leg 106A). In the first call leg 106A, the media call extends from the first UE 102A to a first interface 108A of a GW domain 110 and in the second call leg 106B, the media call extends from the second UE 102B to a second interface 108B of the GW domain 110 (also may be referred to as the core network domain). In addition to gateway devices 112A and 112B (e.g. media gateways or border gateways) in the GW domain 110, the media call may be facilitated by devices of a first radio access network domain 114A (in first call leg 106A) and a second radio access network domain 114B (in second call leg 106B), each configured to provide radio access to their respective UEs 102 in a radio link domain and an access network domain using LTE communication protocols.

A media call may suffer quality degradation due to relatively poor performance of a variety of sources in the call path. As such, in an aspect of the present disclosure, the network node 116 identifies certain candidate sources 124 as including one or more of these actual sources of quality degradation in the media call path (e.g., devices and links), including but not limited to first UE 102A, second UE 102B, devices and links in GW domain 110 including gateway devices 112A and 112B, and first radio access network domain 114A and second radio access network domain 114B, including one or more links and one or more radio base stations.

In an aspect, the communication network 100 may further include a network node 116 configured to obtain a set of multiple rules 118 specified respectively for multiple candidate sources 124 of quality degradation for the media call in the first direction 104A and/or the second direction 104B. Each of these rules 118 may be static (e.g., preconfigured or programmed by the network operator) or dynamic (i.e., updated based on event detection or periodically), and may be defined by the network node 116 or received from another network node 116 and/or UE.

The network node 116 may be further configured to evaluate these rules 118 to identify which of multiple candidate sources 124 of quality degradation are in fact actual sources 126. In some embodiments, each candidate source has an associated rule 118 that takes the form of a Boolean function, the evaluation of which may be performed by the network node 116. As a Boolean function, the evaluation of each rule returns a positive or negative Boolean value (or, stated differently, a true or false, or yes or no, or any other binary value) defined by one or more Boolean/binary input values. The candidate sources 124 are identified as actual sources 126 of media call degradation when the value returned by evaluating the specific rule 118 corresponding to the candidate source returns a particular value. For instance, in an example, if the result of evaluating a rule 118 returns a TRUE value, the network node 116 may identify the corresponding candidate source as an actual source of quality degradation for the media call, where a FALSE value identifies the candidate source as not being an actual source of such degradation (though opposite values (i.e., FALSE and TRUE, respectively) may also be used to make the determination).

In some examples, these input values represent a result of one or more KPI-specific comparisons between the given KPI 120 and another value. This other value can be a KPI-specific threshold value or an obtained value of another KPI altogether. Based on the result of these comparisons (less than or greater than or equal to, for example), the network node 116 is able to evaluate each of the candidate-source-specific rules 118 to determine whether the corresponding candidate source is an actual source of quality degradation for the media call. As introduced above, the candidate sources 124 of quality degradation may include one or more devices, links, interfaces, domains (GW domain, radio link domain, and/or access network domain, network components, or any other potential source of quality degradation along the media call path, including, but not limited to, the examples presented in relation to FIG. 1, or any other figure herein. Specific rules 118 and how the relative values of each of the KPIs 120 versus corresponding KPI-specific thresholds (or values of other KPIs altogether) define each the rules 118 will be discussed further below in reference to method 200 of FIG. 2.

In addition, although the network node 116 may perform the comparisons of KPIs 120 to thresholds or other obtained KPI values, the network node 116 may not perform these comparisons and may instead simply receive the result of these comparisons from another device that may in fact perform the comparisons (or received the results from yet another network node that does). Furthermore, the network node 116 may perform the additional step of generating the KPI values from raw performance data obtained from candidate sources 124, or the candidate sources 124 themselves may calculate the KPI values from the raw performance data observed locally (e.g., via a local probe module). In either of these cases, the network module may receive communications 128 related to the KPIs from each of the multiple candidate sources 124, with the communications 128 containing computed KPIs, raw performance data (or even comparison results performed by one or more of the candidate sources 124 124). In an aspect, each of the communications 128 may take the form of a particular report type associated with a particular reporting device (e.g., UEs 102, GWs 112, radio base stations, etc.), domain (e.g., GW domain, radio link domain, core network domain), and/or communication protocol (e.g., Real-time Transport Protocol (RTP)/RTP Control Protocol (RTCP) probe report(s), radio base station (RBS) log(s), UE/terminal voice agent report(s)).

Figure 2:
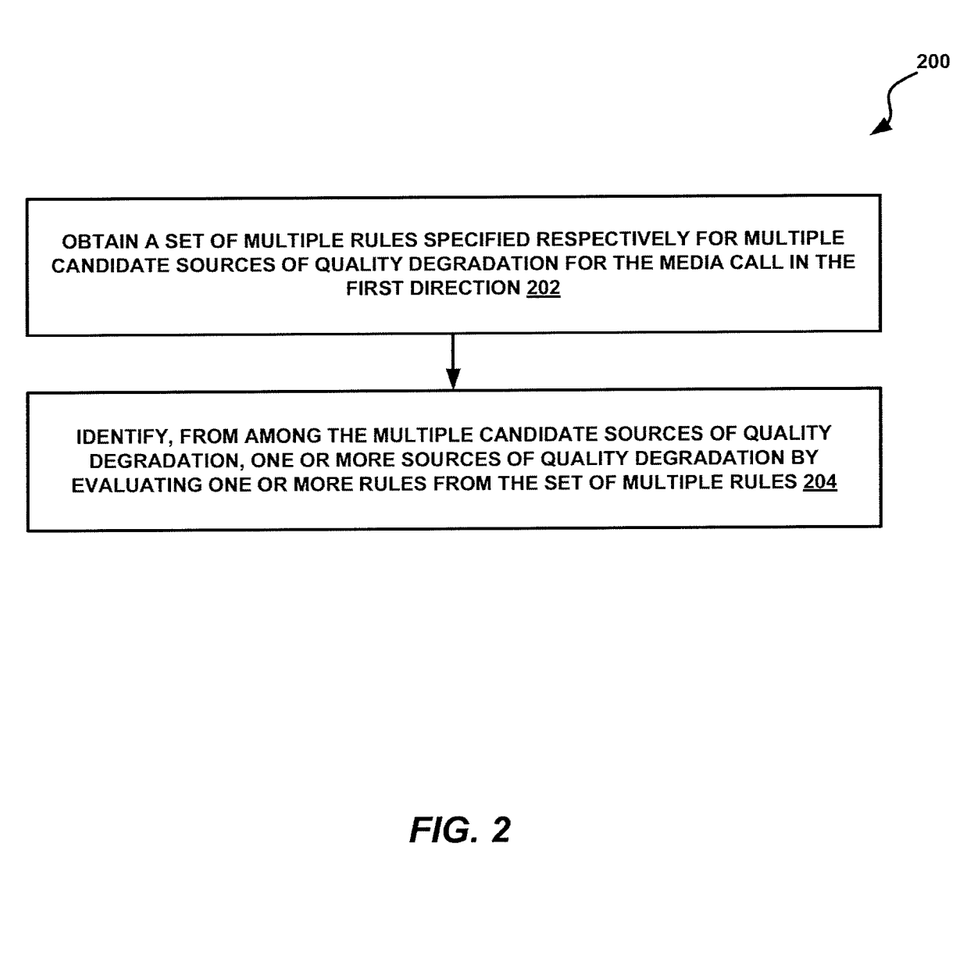
FIG. 2 illustrates a method performed by the network node according to one or more embodiments.

FIG. 2 illustrates an exemplary method 200 performed by network node 116 for identifying a source of quality degradation for a media call. In an embodiment, the media call is flowing in a first direction from a first call leg to a second call leg via a GW domain and in a second direction from the second call leg to the first call leg via the GW domain. In some examples, the first call leg may be a MO side of the call between a MO UE and a MO-side GW interface or an MT side of the media call between a MT UE and a MT-side GW interface. In other words, the first call leg can extend from a first user UE to a first interface of the GW domain via a first radio access network and, likewise, the second call leg extends from a second interface of the GW domain to a second UE via a second radio access network.

At block 202, method 200 may include obtaining a set of multiple rules specified respectively for multiple candidate sources of quality degradation for the media call in the first direction (i.e., one of MO→MT and MT→MO). As introduced above, each of the multiple rules may correspond to one of multiple candidate sources for quality degradation in the media call. Furthermore, each of the multiple rules may depend upon comparisons between particular KPIs and corresponding threshold values or values of different obtained KPIs.

For purposes of the present disclosure, the terms "KPI," "KPIs," "KPI value," or "KPI values" refer to a directly measured or calculated value of a parameter type that is indicative of media call performance. Such a represented parameter type may be selected (e.g., by a candidate source, a network administrator or operator, a UE user, a network node 116, or any other person or device associated with a VoLTE communication network) as being a representative parameter type of multiple potential parameter types measured at an interface, device, point, or other particular location in the media call flow path. In a further aspect, each KPI may be identified according to a media call flow direction (first direction 104A or second direction 104B, mobile-originating (MO)-to-mobile-terminating (MT) (noted as MO→MT herein) or MT-to-MO (noted as MT→MO herein), uplink or downlink), the media call leg (i.e., first leg 106A or second leg 106B, i.e., MO or MT leg, etc.) at which the KPI's raw data was measured, and based on a data collection component or report type from which the KPI value or underlying data was obtained. These data collection components/report types (referred to herein as KPI "type") may include, but not limited to, RTP/RTCP probes at the MO GW interface and MT GW interface, RBS radio link measurement reports at the MO and MT radio interfaces, terminal agent voice waveform and quality analyzer and reporting function for the first UE 102A and the second UE 102B (i.e., the MO and MT UEs for the media call). The above data collection components may, in some instances, generate KPI values representative of media call quality in a particular domain, leg, and/or traffic flow direction. For instance, each of the following KPIs shown in Table 1 below may be calculated by UEs, network nodes, and other wireless communication network devices in the present embodiments:

TABLE 1

Example KPIs

| KPI Name | Leg | KPI Type | Direction |
| --- | --- | --- | --- |
| KPI_MO_RTP_UP | MO | RTP/RTCP Probe | Uplink |
| KPI_MO_RTP_DOWN | MO | RTP/RTCP Probe | Downlink |
| KPI_MO_RBS_UP | MO | RBS RL Measurement | Uplink |
| KPI_MO_RBS_DOWN | MO | RBS RL Measurement | Downlink |
| KPI_MO_UE_UP | MO | UE/Terminal Agent | Uplink |
| KPI_MO_UE_DOWN | MO | UE/Terminal Agent | Downlink |
| KPI_MT_RTP_UP | MT | RTP/RTCP Probe | Uplink |
| KPI_MT_RTP_DOWN | MT | RTP/RTCP Probe | Downlink |
| KPI_MT_RBS_UP | MT | RBS RL Measurement | Uplink |
| KPI_MT_RBS_DOWN | MT | RBS RL Measurement | Downlink |
| KPI_MT_UE_UP | MT | UE/Terminal Agent | Uplink |
| KPI_MT_UE_DOWN | MT | UE/Terminal Agent | Downlink |

Here, three different types of KPIs are applied (RTP/RTCP KPIs, RBS KPIs and Terminal agent KPIs) and the following general notation for these KPIs is used: KPI_leg_type_dir, where "leg" can be either MT or MO, depending on whether the KPI is measured on the Mobile Terminated (MT) side or on the Mobile Originated (MO) side of the call, where "type" can be either be RTP or RBS, or UE, denoting the three types of KPIs (RTP/RTC based, RBS based and terminal agent based), and where "dir" can be either UP or DOWN, corresponding to whether the KPI is measured for the uplink direction or for the downlink direction.

As noted above, each KPI above may represent a parameter selected from a set of multiple parameter values. Though each of these parameters (listed below) do indicate performance and thus may be literally considered "key performance indicators," we use the parameter or variable notation herein to avoid confusion between these parameters and the generic KPI nomenclature above defined not by any particular parameter described below, but by the leg, KPI type, and direction associated with a KPI. In other words, each of the different KPIs represent a parameter selected from different possible parameters that are each indicative of media flow quality in either the first direction or the second direction and calculated from media flow data measurements performed by a particular device at a particular interface.

Furthermore, KPI reporting may occur on a per-call or per-call-slice basis, where the media call can be divided into fixed-length time slices (default is set to 5 seconds, although this can be altered and is merely exemplary) and for each time slice all KPIs have a reported value representative to that slice.

For example, the following example parameters or values can represent any KPI with the RTP/RTCP type (derived from RTP/RTCP probe):

max_jitter: the maximum value of the jitter reported by RTCP or measured from RTP packets in the particular call slice.

max_delay: the maximum value of the delay reported by RTCP or measured from RTP packets in the particular call slice.

n_sum_out_of_sequence: the sum of the missing packets, as detected by out of sequence RTP packet receptions in the particular call slice.

max_out_of_sequence: the maximum consecutive missing RTP packets, as detected by the highest out of sequence packet arrival.

n_sum_jump_back: the sum of the RTP sequence number jump back steps in the particular call slice.

max_jump_back: the maximum of the sequence number jump backs in the call slice.

n_restarts: the number of sequence number restarts in the call slice n_codec_upswitch: the number of codec rate up-switches in the call slice (i.e., voice coded switching to higher rate encoding).

n_codec_downswitch: the number of codec rate down-switches in the call slice (i.e., voice coded switching to lower rate encoding).

ind_min_rtp_packet: an indicator KPI, indicating when the number of RTP packets in the call slice is below a minimum threshold, including also when no RTP packets are seen in slice.

n_rtp_packets: total number of RTP packets received in the call slice n_voice_packets: total number of voice RTP packets received in the call slice n_noise_packets: total number of noise RTP packets received in the call slice From the above call slice-level KPIs, call-level KPIs can be calculated by aggregating the slice-level KPIs, either by summing up of the slice-level values or by taking the maximum or minimum over of the slice-level values.

Additionally or alternatively, in some embodiments, the call level KPIs can be obtained on a per-leg basis (MO or MT) and/or per direction (first direction 104A/second direction 104B, or uplink/downlink), optionally resulting in four values per call (i.e., MO_UP, MO_DOWN, MT_UP and MT_DOWN). These per-leg and per-direction values can be further aggregated to obtain the following KPI values:

MO→MT end-to-end call leg KPI by aggregating MO_UP and MT_DOWN KPI values

MT→MO end-to-end call leg KPI by aggregating MT_UP and MO_DOWN KPI values

End-to-end call KPI by aggregating MO→MT and MT→MO KPIs

Like RTP/RTCP reports, RBS Radio Link (RL)-type KPIs can be reported on a call or call slice basis, though whether a RBS is capable of reporting with the same temporal granularity as RTP/RTCP probes (e.g., with 5 sec resolution) can be vendor- and configuration-dependent. As such, in some example cases, the RBS RL reports may be generated only once at the end of the call, in which case the more granular time-slice-level KPI calculation and reporting would not occur.

The RBS RL KPIs may also have several optional parameter or variable types, which include one or more of the following non-limiting examples:

Number of radio packets lost in uplink and downlink, e.g. per radio bearer (including the VoLTE bearer)

Radio signal strength and quality measurements (RSRP/RSRQ and CQI measurements)

LTE to LTE handover events

LTE to 3G handover events (Single Radio Voice Call Continuity (SRVCC) handover, Single Radio Voice Call Continuity)

Radio link loss event

The terminal agent reported information from UEs 102 may contain (1) an RTP/RTCP probe, (2) codec reporting, and/or (3) a waveform analyzer function. The RTP/RTCP probe reported parameters or variables as those introduced above for the network-side RTP/RTCP probes. The codec reports may contain information indicating, for instance, a number of bad/corrupted speech (or other media) frames, a number of missing frames, a play-out buffer status. The wavelength analyzer may report events when distorted audio wavelength is detected.

In some embodiments, the network node 116 may directly receive the RTP/RTCP reports, RBS RL measurement reports, or terminal reports, and calculate the KPIs based on the information contained in these reports. In other implementations, another device may forward the reports to the network node 116 or may even calculate the KPIs and forward the KPIs to the network node 116 for rule evaluation. Thus, in some examples, the network node 116 may receive information necessary for evaluating the obtained rules from a probe agent, an intermediate network node, a media GW, a radio base station, the first UE, and/or the second UE, and that information may include one or more reports, raw measurement data, or computed KPIs.

Furthermore, in certain deployment scenarios, not all KPI types from all data source components may be available. In such cases, a subset of KPI sources/types (e.g., only RTP/RTCP probe sources) may be utilized for KPI value calculation and reporting (e.g., while the RBS reporting and terminal agent reporting are optional.

In view of the particular KPI examples presented above, returning to method 200 of FIG. 2, the set of multiple rules obtained by the network node 116 at block 202 may include those presented below. Each of the example rules are presented in both a general form that does not reference the exact KPI(s) from Table 1 above and, following each general rule description, in specific examples that utilize the KPI nomenclature conventions of Table 1. Two specific examples are provided for each of the general rules below because each of the rules can be applied for both the MO→MT traffic (e.g., MO→MT is the first direction and the MO UE is the first UE) and for the MT→MO traffic as illustrated above in FIG. 1 and also in FIG. 3, below. Thus, each of the obtained rules may be agnostic to media call traffic direction and therefore may be applied with respect to traffic in the first and second directions, individually. Alternatively, the obtained rules may be more specific than those presented below. For instance, the obtained rules may specify rules unique to traffic in the MO→MT direction and separate rules unique to traffic in the MT→MO direction.

Furthermore, as discussed above, in each of the specific examples, to determine whether a particular KPI satisfies its associated performance criterion, the KPI value may be compared to a threshold value associated with any particular KPI. Alternatively or additionally, the KPI value may be compared to another obtained KPI value to evaluate a particular rule (see "worse than" comparison in Rule 4 below).

Thus, the following may be included in the set of multiple rules obtained by the network node at block 202:

Rule 1: the first UE is a source of quality degradation if a first KPI indicating performance of the media call at the first UE in the first direction does not satisfy a first performance criterion defined for the first KPI.

Specific Examples of Rule 1:
MO is a source of quality degradation where KPI_MO_UE_UP does not meet its performance criterion.
MT is a source of quality degradation where KPI_MT_UE_UP does not meet its performance criterion.

Rule 2: the first leg in the first direction is a source of quality degradation if a second KPI indicating performance of the media call at the first interface of the GW domain does not satisfy a second performance criterion defined for the second KPI.

Specific Examples of Rule 2:
MO to GW link is a source of quality degradation where KPI_MO_RTP_UP does not meet its performance criterion
MT to GW link is a source of quality degradation where KPI_MT_RTP_UP does not meet its performance criterion Rule 3: the GW domain is a source of quality degradation if a third KPI indicating performance of the media call at the second interface of the GW domain does not satisfy a third performance criterion defined for the third KPI, but the second KPI does satisfy the second performance criterion.

Specific Examples of Rule 3:
The GW domain (e.g., device(s) or link(s)) is a source of quality degradation where KPI_MO_RTP_UP meets its performance criterion AND KPI_MT_RTP_DOWN does not meet its performance criterion
The GW domain (e.g., device(s) or link(s)) is a source of quality degradation where KPI_MT_RTP_UP meets its performance criterion AND KPI_MO_RTP_DOWN does not meet its performance criterion Rule 4: the GW domain is a source of quality degradation if the second KPI is worse than the third KPI.

Specific Examples of Rule 4:
The GW domain is a source of quality degradation where KPI_MT_RTP_DOWN is worse than KPI_MO_RTP_UP
The GW domain is a source of quality degradation where KPI_MO_RTP_DOWN is worse than KPI_MT_RTP_UP Rule 5: the second leg in the first direction is a source of quality degradation if a fourth KPI indicating performance of the media call at the second radio access network does not satisfy a fourth performance criterion defined for the fourth KPI, but the third KPI does satisfy the third performance criterion.

Specific Examples of Rule 5:
GW→MT link is a source of quality degradation where KPI_MT_RBS_DOWN does not meet its performance criterion AND KPI_MO_RTP_UP meets its performance criterion
GW→MO link is a source of quality degradation where KPI_MO_RBS_DOWN does not meet its performance criterion AND KPI_MT_RTP_UP meets its performance criterion Rule 6: the second UE is a source of quality degradation if the second KPI satisfies the second performance criterion and the fourth KPI satisfies the fourth performance criterion, but a fifth KPI indicating performance of the media call at the second UE in the first direction does not satisfy a fifth performance criterion defined for the fifth KPI.

Specific Examples of Rule 6:
  MO is a source of quality degradation where KPI_MO_RTP_DOWN and KPI_MO_RB-S_DOWN meet their performance criterion AND KPI_MO_UE_DOWN does not meet its performance criterion
  MT is a source of quality degradation where KPI_MT_RTPDOWN and KPI_MT_RB-S_DOWN meet their performance criterion AND KPI_MT_UE_DOWN does not meet its performance criterion Returning to FIG. 2, at block 204, once the set of multiple rules (e.g., rules 1-6 above, in a non-limiting example) are obtained by the network node 116 at block 202, it may identify, from among the multiple candidate sources of quality degradation, one or more sources of quality degradation (i.e., actual sources of quality degradation) by evaluating one or more rules from the set of multiple rules. In other words, after receiving the rules, the network node 116 evaluates the rules by determining whether each of the particular conditions in each rule is present. This evaluation of the one or more rules therefore requires that the network node 116 (or another device who communicates the results to the network node 116) determine whether each of the KPIs defining the rule conditions meets its respective performance criterion (and whether the KPI is greater than, less than, or equal to another KPI, in some cases). As such, although it is not explicitly shown in FIG. 2, method 200 may include obtaining information indicating whether the first KPI satisfies the first performance criterion, the second KPI satisfies the second performance criterion, the third KPI satisfies the third performance criterion, the second KPI is worse than the third KPI, the fourth KPI satisfies the fourth performance criterion, the second KPI satisfies the second performance criterion, and the fifth KPI satisfies the fifth performance criterion.

For purposes of the present disclosure, determining whether a particular KPI satisfies its corresponding performance criterion may include comparing the KPI to a KPI-specific threshold value and determining whether the KPI is greater than, less than, or equal to the threshold value. In some instances, the performance criterion is deemed to have been satisfied where it is determined that the KPI is greater than the threshold, while in others, the performance criterion is deemed to have been satisfied where it is determined that the KPI is less than the threshold. Also, in some embodiments, the performance criterion is deemed to have been satisfied where it is determined that the KPI is equal to the threshold, while in others, the performance criterion is deemed to have been satisfied where it is determined that the KPI is equal to the threshold. Furthermore, when a KPI must be compared to a different KPI to evaluate a rule, the KPI can be considered "worse than" (or "better than") the different KPI when the KPI value is less than that of the different KPI, or in some cases, when the KPI value is greater than the different KPI. If the two KPIs have the same value, in some cases this may signal that the KPI is worse than the different KPI, while in other cases this may signal that the KPI is better than the different KPI.

Figure 3:
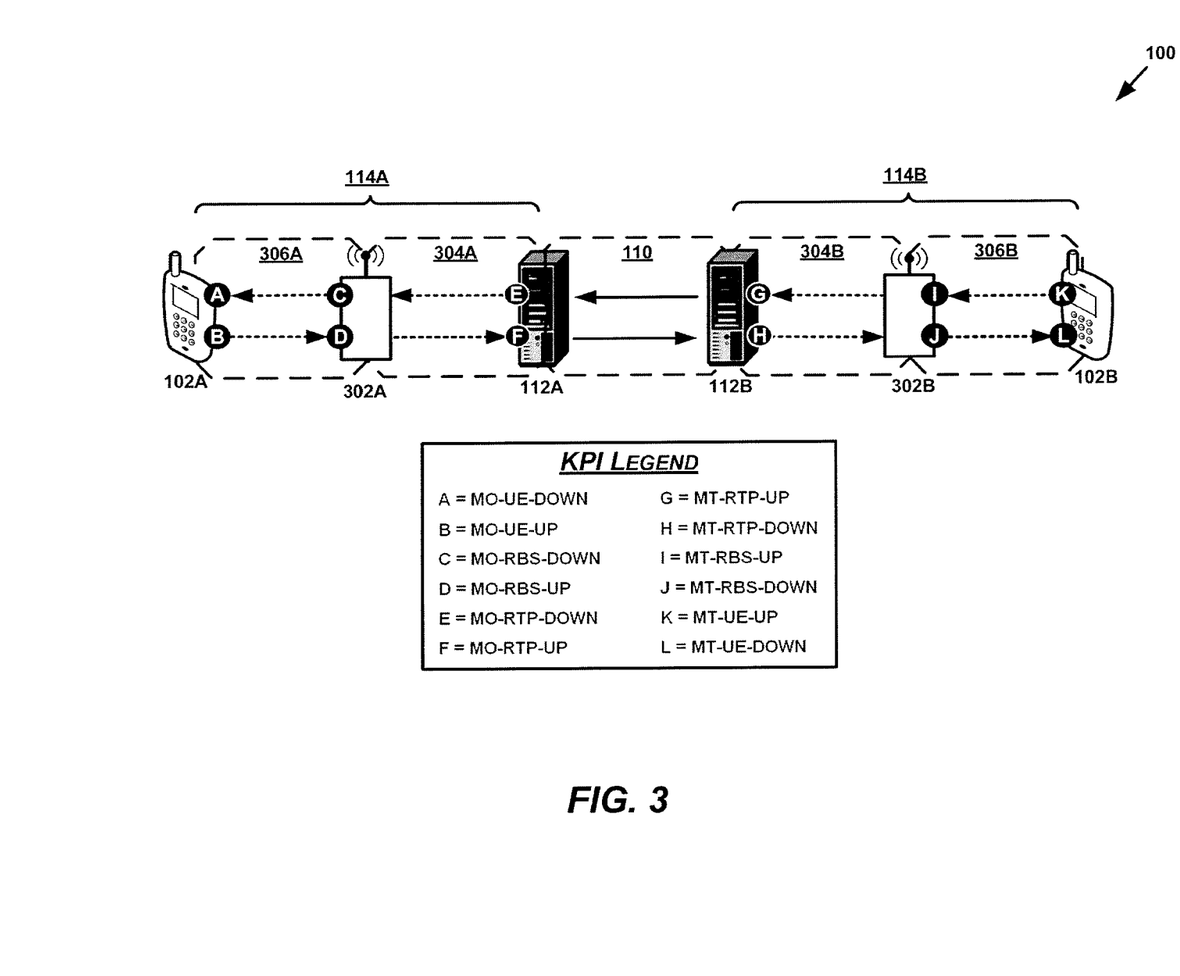
FIG. 3 illustrates a communication network and shows measurement locations of different example KPIs as utilized in example embodiments of the present invention.

With the particular example KPIs introduced above in mind, FIG. 3 illustrates a more detailed view of communication network 100 and shows measurement locations of different example KPIs in communication network 100. In FIG. 3, the network location associated with each of the example KPIs is indicated by a black circle that includes a letter. The KPI Legend indicates links the letters with the identifying information of the particular KPIs.

As shown in FIG. 3, the radio access network domains 114A and 114B (included in FIG. 1) include both a radio link domain 306 and an access network domain 304, which respectively interface at a radio access point 302A and 302B, respectively. Likewise, the access network domains 304A and 304B interface with the GW domain 110 (or core network domain) at GWs 112A and 112B, respectively. As indicated in FIG. 3, the performance data parameters (or "raw data" as also used herein) from which the respective KPIs are calculated are measured at these domain interfaces. Though the dashed boxes indicating the different domains are presented in FIGS. 1 and 3 as a helpful abstraction, the domains are not stand-alone physical entities in and of themselves (though they may contain multiple physical devices) and therefore are not capable of media flow parameter measurement. As such, although the KPI measurement points may be associated with an interface between domains, such an interface is realized in a particular device located at the periphery of any particular domain abstraction. For purposes of the illustration of FIG. 3, the devices that actually perform media flow measurement are the UEs 102 (at the periphery of radio link domains 306), radio base stations 302 (at the interface between radio link domains 306 and access network domains 304), and GW devices 112 (at the interface between access network domain 304 and GW domain/core network domain 110).

Measurement may be performed at each of these devices by a probe module that samples appropriate packets associated with a media flow and may perform raw data collection, storage, transmission, and/or KPI calculation associated with the sampled packets. Furthermore, as shown in FIG. 3, the devices may each measure media flow data that is traveling in both uplink and downlink directions. As such, though these measurement points are indicated as separate KPIs having separate letters at a single domain interfaces, measurement and processing related to the separate KPIs may be performed by a single probe module running in the corresponding device (i.e., probe device). When the probe device has completed its measurement and processing for a media call or slices thereof (e.g., 5-second portions of the media call), the probe module may transmit the raw data and/or KPI values to another device, such as, but not limited to, the network node 116 of FIG. 1, for further utilization.

Figure 4:
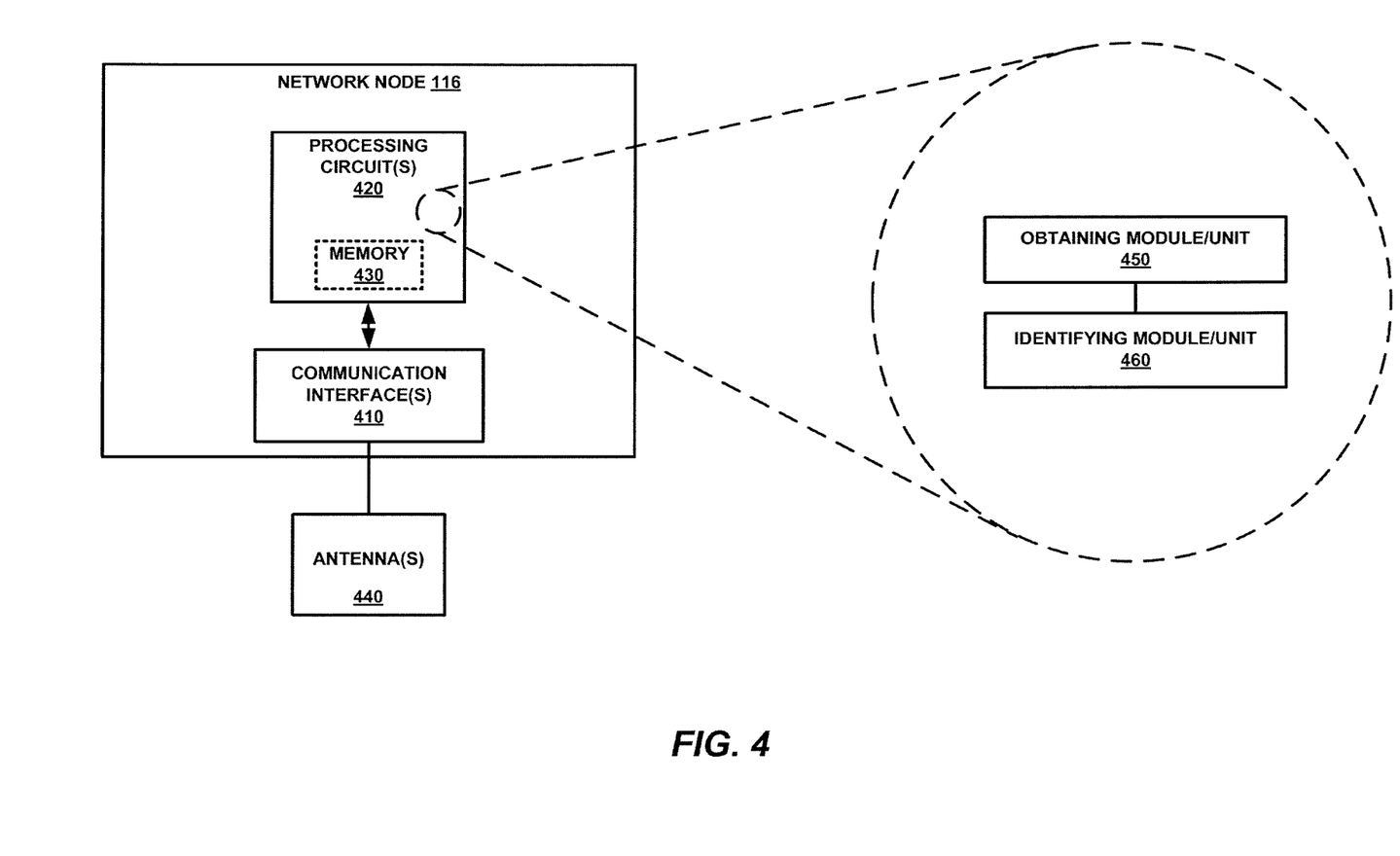
FIG. 4 illustrates details of an example network node according to one or more embodiments.

FIG. 4 illustrates additional details of an example network node 116 according to one or more embodiments. The network node 116 is configured, e.g., via functional means or units, to implement processing to perform the aspects described above in reference to FIG. 2. The network node 116 in some embodiments for example includes an obtaining means, module or unit 450 and an identifying means, module or unit 460 for performing the aspects of method 200 presented in FIG. 2. For example, the obtaining means, module or unit 450 may be configured to perform the obtaining step at block 202 of method 200 and the identifying means, module or unit 460 may be configured to perform the identifying step at block 204 of method 200.

In at least some embodiments, the network node 116 comprises one or more processing circuits 420 configured to implement processing of the method 200 of FIG. 2, such as by implementing functional means or units above. In one embodiment, for example, the processing circuit(s) 420 implements functional means or units as respective circuits. The circuits in this regard may comprise circuits dedicated to performing certain functional processing and/or one or more microprocessors in conjunction with memory 430. In embodiments that employ memory 430, which may comprise one or several types of memory such as read-only memory (ROM), random-access memory, cache memory, flash memory devices, optical storage devices, etc., the memory 430 stores program code that, when executed by the one or more for carrying out one or more microprocessors, carries out the techniques described herein.

In one or more embodiments, the network node 116 also comprises one or more communication interfaces 410. The one or more communication interfaces 410 include various components (e.g., antennas 440) for sending and receiving data and control signals. More particularly, the interface(s) 410 include a transmitter that is configured to use known signal processing techniques, typically according to one or more standards, and is configured to condition a signal for transmission (e.g., over the air via one or more antennas 440). In an aspect, a transmitting module or unit may comprise or may be in communication with the transmitter. Similarly, the interface(s) include a receiver that is configured to convert signals received (e.g., via the antenna(s) 440) into digital samples for processing by the one or more processing circuits. In an aspect, a receiving module or unit may comprise or may be in communication with the receiver. The transmitter and/or receiver may also include one or more antennas 440.

Those skilled in the art will also appreciate that embodiments herein further include corresponding computer programs. A computer program comprises instructions which, when executed on at least one processor of the network node 116 or the end node, cause the node to carry out any of the respective processing described above. Embodiments further include a carrier containing such a computer program. This carrier may comprise one of an electronic signal, optical signal, radio signal, or computer readable storage medium. A computer program in this regard may comprise one or more code modules corresponding to the means or units described above.

Figure 5:
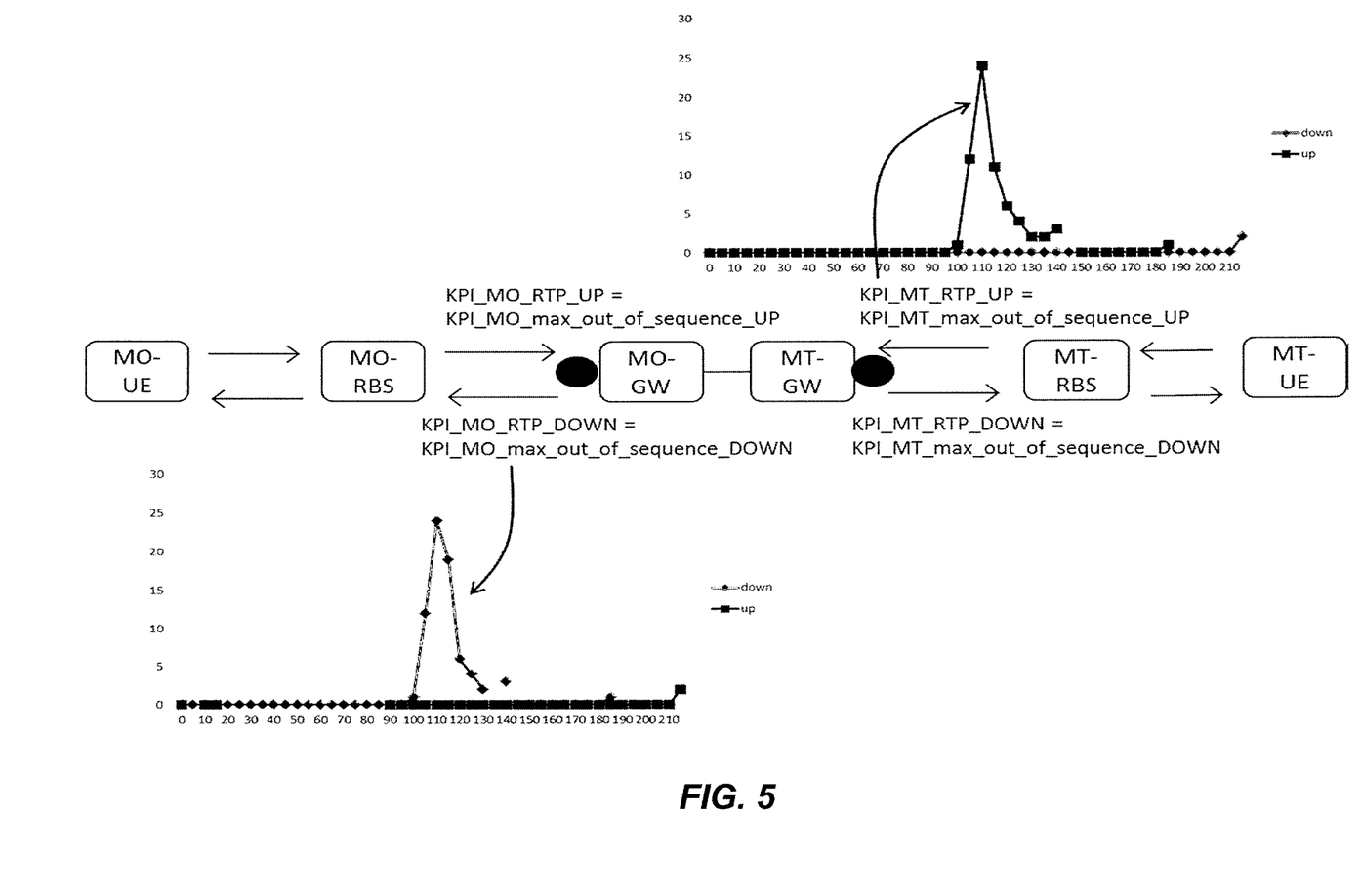
FIG. 5 illustrates a network deployment of an example fault localization for muted/garbled calls and corresponding KPI charts.

In the following, an example fault localization for muted/garbled calls is described with reference to FIG. 5. One of the key pain points for operators when introducing Voice over LTE services is to be able to monitor voice quality and be able to root cause analyze and localize any voice quality problems that occur in the network. One typical voice quality problem is, when during a call, the voice in either direction gets muted (e.g., for several seconds) or gets distorted, i.e., garbled (without being completely muted). The following example illustrates, based on data taken from a real operator network, how the muted/garbled calls can be detected and the fault localized with the above proposed methodology. FIG. 5 illustrates a live network deployment used for the example. This deployment includes only the RTP/RTCP based KPIs produced by the packet probes on the GW sites. In the example, the max_out_of_sequence KPI (see the definition above) is used to detect the muted/garbled call quality problems and, therefore, the following four KPIs are used:

KPI_MT_max_out_of_sequence_UP (a specific example for the KPI_MT_RTP_UP generic KPI): the max_out_of_sequence KPI measured on MT side uplink, KPI_MT_max_out_of_sequence_DOWN (a specific example for the KPI_MT_RTP_DOWN generic KPI): the max_out_of_sequence KPI measured on MT side downlink, KPI_MO_max_out_of_sequence_UP (a specific example for the KPI_MO_RTP_UP generic KPI): the max_out_of_sequence KPI measured on MO side uplink, and KPI_MO_max_out_of_sequence_DOWN (a specific example for the KPI_MO_RTP_DOWN generic KPI): the max_out_of_sequence KPI measured on MO side downlink.

The charts in FIG. 5 show these four KPIs over time (each dot on the timeline corresponds to the value of the KPI for one 5 second time slice). In the figure, there is one chart for the MO side and one for the MT side and the UP and DOWN directions are shown with different lines on each chart.

For this particular KPI (max_out_of_sequence), one may say that, when the number of out of sequence lost packets are above a certain threshold, then a muted/garbled effect in the voice quality is caused, i.e.:

quality degradation is determined, if max_out_of_sequence>=thr_oos, where the threshold thr_oos may have the value ~20 (which was found to be a good value based on experiments), i.e., at least 20 consecutive packet losses are needed in order to have a muting effect in the call, no quality degradation is determined, if max_out_of_sequence<thr_oos.

Next, the fault localization rules described above are applied to detect the root cause of the fault. The RTP based rules are applied to determine which rules hold in this particular example. If the "MT to MO direction" rules and the "MO to MT direction" rules are evaluated, then one may find that only the following rule holds:

KPI_MT_max_out_of_sequence_UP=25 does not meet its performance criterion (see the spike in the figure on MT side uplink).

This rule indicates that the problem is on the MT to GW link (most probably the packet lost has occurred on the radio link from MT on the uplink direction). Note also that on the other chart (MO side leg) the same spike in the max_out_of_sequence KPI can be seen but that is the consequence of the same packet loss that already occurred on the MT side link. Therefore, no rules will fire for the GW to MO side link.

As has become apparent from the above, the present disclosure provides a rule based voice quality fault localization method which may be based on multiple input sources, including (1) the KPIs derived from RTP and RTCP probes taken at multiple points in the network, (2) RBS logs and (3) terminal voice agent reports. The KPIs and proposed rules may be developed for most typical probe and monitoring deployment scenarios but can be similarly applied in other deployment configurations. The proposed technique may enable accurate fault localization by the use of the combination of the above three information sources. The proposed technique may be flexible in the sense that it can be used also when any of the above sources is missing or not available.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, implemented at a network node, for identifying a source of quality degradation for a media call flowing in a first direction from a first call leg to a second call leg via a gateway (GW) domain and in a second direction from the second call leg to the first call leg via the GW domain, wherein the first call leg extends from a first user equipment (UE) to a first interface of the GW domain via a first radio access network, wherein the second call leg extends from a second interface of the GW domain to a second UE via a second radio access network, the method comprising:
obtaining a set of multiple rules specified respectively for multiple candidate sources of quality degradation for the media call in the first direction, wherein the set of multiple rules includes two or more items from the following list:
the first UE is a source of quality degradation if a first Key Performance Indicator (KPI) indicating performance of the media call at the first UE in the first direction does not satisfy a first performance criterion defined for the first KPI;
the first leg in the first direction is a source of quality degradation if a second KPI indicating performance of the media call at the first interface of the GW domain does not satisfy a second performance criterion defined for the second KPI;
the GW domain is a source of quality degradation if a third KPI indicating performance of the media call at the second interface of the GW domain does not satisfy a third performance criterion defined for the third KPI, but the second KPI does satisfy the second performance criterion;
the GW domain is a source of quality degradation if the second KPI is worse than the third KPI;
the second leg in the first direction is a source of quality degradation if a fourth KPI indicating performance of the media call at the second radio access network does not satisfy a fourth performance criterion defined for the fourth KPI, but the third KPI does satisfy the third performance criterion; and/or
the second UE is a source of quality degradation if the second KPI satisfies the second performance criterion and the fourth KPI satisfies the fourth performance criterion, but a fifth KPI indicating performance of the media call at the second UE in the first direction does not satisfy a fifth performance criterion defined for the fifth KPI;
identifying, from among the multiple candidate sources of quality degradation, one or more sources of quality degradation by evaluating one or more rules from the set of multiple rules.

2. The method of claim 1, further comprising obtaining information indicating whether:
the first KPI satisfies the first performance criterion;
the second KPI satisfies the second performance criterion;
the third KPI satisfies the third performance criterion;
the second KPI is worse than the third KPI;
the fourth KPI satisfies the fourth performance criterion; and/or
the fifth KPI satisfies the fifth performance criterion.

3. The method of claim 2, wherein the obtaining the information comprises receiving at least some of the information from a probe agent device, an intermediate network node, a media GW, a radio base station, the first UE, and/or the second UE.

4. The method of claim 2, wherein the obtaining the information comprises:
receiving the different KPIs; and
determining at least some of the information at the network node by comparing the different KPIs to different corresponding thresholds.

5. The method of claim 1:
wherein each of the different KPIs represents a parameter selected from different possible parameters;
wherein the different possible parameters comprise parameters that are each indicative of media flow quality in either the first direction or the second direction and are each based on media flow data measurements performed by a particular device at a particular interface.

6. The method of claim 5, wherein the device is a radio base station, the first UE, the second UE, or a media gateway.

7. The method of claim 1, wherein the first UE is a mobile-originating UE and the second UE is a mobile-terminating UE.

8. The method of claim 7, wherein the first direction is a mobile-terminating (MT)-to-mobile-originating (MO) direction and the second direction is a MO-to-MT direction.

9. The method of claim 1, wherein the first UE is a mobile-terminating UE and the second UE is a mobile-originating UE.

10. The method of claim 9, wherein the first direction is a mobile-terminating (MT)-to-mobile-originating (MO) direction and the second direction is a MO-to-MT direction.

11. A network node for identifying a source of quality degradation for a media call flowing in a first direction from a first call leg to a second call leg via a gateway (GW) domain and in a second direction from the second call leg to the first call leg via the GW domain, wherein the first call leg extends from a first user equipment (UE) to a first interface of the GW domain via a first radio access network, wherein the second call leg extends from a second interface of the GW domain to a second UE via a second radio access network, the network node comprising:
processing circuitry;
memory containing instructions executable by the processing circuitry whereby the network node is operative to:
obtain a set of multiple rules specified respectively for multiple candidate sources of quality degradation for the media call in the first direction, wherein the set of multiple rules includes two or more items from the following list:
the first UE is a source of quality degradation if a first Key Performance Indicator (KPI) indicating performance of the media call at the first UE in the first direction does not satisfy a first performance criterion defined for the first KPI;
the first leg in the first direction is a source of quality degradation if a second KPI indicating performance of the media call at the first interface of the GW domain does not satisfy a second performance criterion defined for the second KPI;
the GW domain is a source of quality degradation if a third KPI indicating performance of the media call at the second interface of the GW domain does not satisfy a third performance criterion defined for the third KPI, but the second KPI does satisfy the second performance criterion;
the GW domain is a source of quality degradation if the second KPI is worse than the third KPI;

the second leg in the first direction is a source of quality degradation if a fourth KPI indicating performance of the media call at the second radio access network does not satisfy a fourth performance criterion defined for the fourth KPI, but the third KPI does satisfy the third performance criterion; and/or the second UE is a source of quality degradation if the second KPI satisfies the second performance criterion and the fourth KPI satisfies the fourth performance criterion, but a fifth KPI indicating performance of the media call at the second UE in the first direction does not satisfy a fifth performance criterion defined for the fifth KPI;

identify, from among the multiple candidate sources of quality degradation, one or more sources of quality degradation by evaluating one or more rules from the set of multiple rules.

12. The network node of claim 11, wherein the instructions are such that the network node is operative to obtain information indicating whether:

the first KPI satisfies the first performance criterion;
the second KPI satisfies the second performance criterion;
the third KPI satisfies the third performance criterion;
the second KPI is worse than the third KPI;
the fourth KPI satisfies the fourth performance criterion; and/or
the fifth KPI satisfies the fifth performance criterion.

13. The network node of claim 12, wherein the instructions are such that the network node is operative to obtain the information by receiving at least some of the information from a probe device, an intermediate network node, a media GW, a radio base station, the first UE, and/or the second UE.

14. The network node of claim 12, wherein the instructions are such that the network node is operative to obtain the information by:

receiving the different KPIs; and
determining at least some of the information at the network node by comparing the different KPIs to different corresponding thresholds.

15. The network node of claim 11:
wherein each of the different KPIs represents a parameter selected from different possible parameters;
wherein the different possible parameters comprise parameters that are each indicative of media flow quality in either the first direction or the second direction and are each based on media flow data measurements performed by a particular device at a particular interface.

16. The network node of claim 15, wherein the device is a radio base station, the first UE, the second UE, or a media gateway.

17. The network node of claim 11, wherein the first UE is a mobile-originating UE and the second UE is a mobile-terminating UE.

18. The network node of claim 17, wherein the first direction is a mobile-terminating (MT)-to-mobile-originating (MO) direction and the second direction is a MO-to-MT direction.

19. The network node of claim 11, wherein the first UE is a mobile-terminating UE and the second UE is a mobile-originating UE.

20. The network node of claim 19, wherein the first direction is a mobile-terminating (MT)-to-mobile-originating (MO) direction and the second direction is a MO-to-MT direction.

21. A non-transitory computer readable recording medium storing a computer program product for controlling a network node for identifying a source of quality degradation for a media call flowing in a first direction from a first call leg to a second call leg via a gateway (GW) domain and in a second direction from the second call leg to the first call leg via the GW domain, wherein the first call leg extends from a first user equipment (UE) to a first interface of the GW domain via a first radio access network, wherein the second call leg extends from a second interface of the GW domain to a second UE via a second radio access network, the computer program product comprising software instructions which, when run on processing circuitry of the network node, causes the network node to:

obtain a set of multiple rules specified respectively for multiple candidate sources of quality degradation for the media call in the first direction, wherein the set of multiple rules includes two or more items from the following list:

the first UE is a source of quality degradation if a first Key Performance Indicator (KPI) indicating performance of the media call at the first UE in the first direction does not satisfy a first performance criterion defined for the first KPI;

the first leg in the first direction is a source of quality degradation if a second KPI indicating performance of the media call at the first interface of the GW domain does not satisfy a second performance criterion defined for the second KPI;

the GW domain is a source of quality degradation if a third KPI indicating performance of the media call at the second interface of the GW domain does not satisfy a third performance criterion defined for the third KPI, but the second KPI does satisfy the second performance criterion;

the GW domain is a source of quality degradation if the second KPI is worse than the third KPI;

the second leg in the first direction is a source of quality degradation if a fourth KPI indicating performance of the media call at the second radio access network does not satisfy a fourth performance criterion defined for the fourth KPI, but the third KPI does satisfy the third performance criterion; and/or the second UE is a source of quality degradation if the second KPI satisfies the second performance criterion and the fourth KPI satisfies the fourth performance criterion, but a fifth KPI indicating performance of the media call at the second UE in the first direction does not satisfy a fifth performance criterion defined for the fifth KPI;

identify, from among the multiple candidate sources of quality degradation, one or more sources of quality degradation by evaluating one or more rules from the set of multiple rules.

* * * * *